United States Patent [19]

Gorin et al.

[11] 4,333,006
[45] Jun. 1, 1982

[54] MULTIFOCAL HOLOGRAPHIC SCANNING SYSTEM

[75] Inventors: Brian A. Gorin; James A. Hardy, both of Cambridge, Ohio

[73] Assignee: NCR Corporation, Dayton, Ohio

[21] Appl. No.: 215,903

[22] Filed: Dec. 12, 1980

[51] Int. Cl.³ .............................................. G06K 7/10
[52] U.S. Cl. .................................... 235/457; 235/462; 235/467; 350/3.71
[58] Field of Search ....................... 235/457, 467, 462; 350/3.71

[56] References Cited

U.S. PATENT DOCUMENTS 3,619,033 11/1971 McMahon .......................... 350/3.71
4,224,509 9/1980 Cheng ................................. 235/457

Primary Examiner—Harold I. Pitts
Attorney, Agent, or Firm—J. T. Cavender; Wilbert Hawk, Jr.; Richard W. Lavin

[57] ABSTRACT

A holographic scanning system for scanning bar code indicia is disclosed in which the light beam of a laser is directed to a first set of holograms located on a single rotating disc in which each hologram will generate an individual scan beam having a slightly different focal length and direction angle from that of the other holograms. The generated scanning beams are directed on a target area through which passes a label or object bearing a bar code indicia. Each of the scan beams is projected in an overlapping relationship on the target area, thereby providing an enhanced depth of focus enabling a more effective reading operation. The light reflected from the bar code indicia is picked up by a second set of holograms mounted on the rotating disc and focused at a point at which is located an optical detector for use in reading the bar code.

11 Claims, 9 Drawing Figures

MULTIFOCAL HOLOGRAPHIC SCANNING SYSTEM

BACKGROUND OF THE INVENTION

In present-day merchandising point-of-sale operations, data pertaining to the purchase of a merchandised item is obtained by reading data encoded indicia such as a bar code printed on the merchandised item. In order to standardize the bar codes used in various point-of-sale readout systems, the grocery industry has adopted a uniform product code (UPC) which is in the form of a bar code. Various reading systems have been constructed to read this bar code, including hand-held wands which are moved across the bar code and stationary optical reader systems normally located within the check-out counter and in which the bar code is read when a purchased merchandise item is moved across a window constituting the scanning area of the counter, which movement is a part of the process of loading the item in a baggage cart.

Various scanning systems presently available utilize a rotating mirror for generating a scan pattern used for reading the bar codes. Other systems utilize holograms for generating a scanning pattern on a target area through which the object bearing a bar code indicia passes. The light reflected from the bar code indicia is used in reading the bar code. An example of this type of scanning system may be found in U.S. Pat. No. 4,224,509, issued in the name of C. C. K. Cheng, which is assigned to the assignee of the present application. In this patent, a rotating disc supports a plurality of holograms, each of which produces a scanning line on a target area off-set to the lines generated by the other holograms, thereby producing a wide scanning area through which the object bearing a UPC coded label passes. Another example of a holographic scanning system is found in U.S. Pat. No. 4,113,343, in which a moving hologram generates a locus of points from a stationary light beam on a target area with the same hologram collecting the light being reflected from the document at each of the locus points and focuses this energy onto a stationary detector to provide electrical signals corresponding to the information scanned on a document.

In all of the prior art patents, the projected scan beams are all focused in a single plane which is located in the plane of movement of the object bearing the coded label. Since many mechandise items support the coded label at various angles to the focal plane of the scanning hologram, complex and expensive optical reflecting systems have been developed to transmit the scanning beam at different angles to cover all possible orientations of the label to ensure a valid scan operation. This requirement limits the operating efficiency of such scanning systems, while increasing their cost. It is therefore an object of this invention to provide an improved scanning system for projecting a multiple-line scan pattern in a bar code reader which provides an enhanced depth of focus at the target area and thus allowing the reading of a label on an object to take place irrespective of the orientation and position of the label. It is a further object of this invention to provide a scanning system which is high in reading efficiency, while low in cost.

SUMMARY OF THE INVENTION

In order to fulfill these objectives, a scanning system is provided which comprises optical means for directing the multiple beams of a laser through a plurality of holograms mounted on a rotating disc, each hologram having a different focal point, thereby projecting the laser beam along a predetermined path across a scan area located in the path of movement of a bar code indicia. Each of the holograms will project its focused scan beam in an overlapping relationship with the other scan beams to produce an enhanced depth of focus of the beams on the label bearing object. A second set of holograms located on the rotating member collects the reflected scanning beams from the object and focuses the beams on an optical detector which generates electrical signals corresponding to the modulation of the scanning beams received for use by a processor in reading the coded label.

BRIEF DESCRIPTION OF THE DRAWINGS

Additional advantages and features of the present invention will become apparent and fully understood from a reading of the following description, taken together with the annexed drawing, in which.

DESCRIPTION OF THE PREFERRED EMBODIMENT

Figure 1:
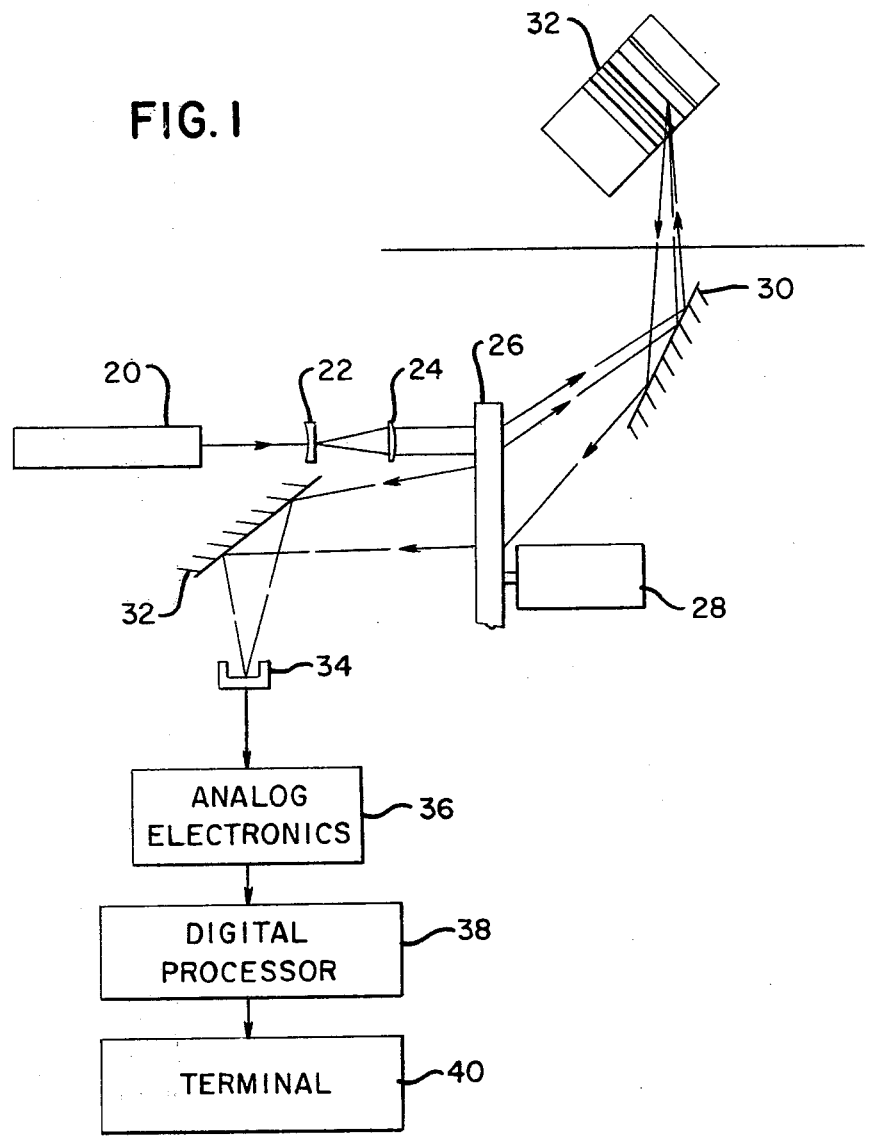
FIG. 1 is a schematic representation of the holographic scanning system of the present invention showing projection lines of the scanning beams generated by the holograms located in the rotating disc.

Referring now to FIG. 1, there is shown a schematic representation of a UPC holographic scanning system employing the present invention which includes a 1 milliwatt helium-neon laser 20 which directs a light beam to a pair of optical lenses 22, 24, which in turn expands and/or otherwise shapes the light beam incident on a rotating disc 26 driven by a motor 28. As will be described more fully hereinafter, the disc 26 has located thereon a plurality of holograms which project the shaped light beam at a mirror 30 which deflects the light beam at a target area through which a UPC label 32 passes. As is well-known in the art, the UPC bar code comprises a plurality of light and dark bars which, when scanned by the scanning apparatus, will generate a specific pulse train waveform. The deflected light beam, upon scanning the bar code label 32, is scattered from the bar code surface and part of this scattered light is directed back towards the disc 26, wherein a second set of collection holograms located on the disc 26 direct the collected light beams at a mirror 32 from which they are projected at a photodetector 34. The photodetector 34 generates electrical signals in response to detecting the changing intensity level in the reflected light beams. These signals are transmitted to an analog electronic unit 36 which decodes the electrical signals and transmits the decoded data to a digital processor 38. The processor 38 will determine if a valid read has occurred and will notify a utilizing device such as terminal 40 that such a valid read operation has occurred.

Figure 2:
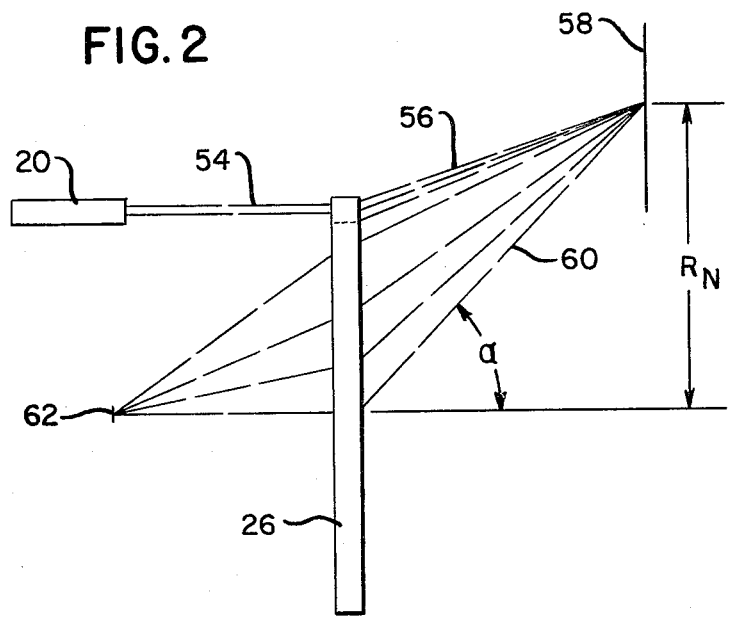
FIG. 2 is a schematic representation of the holographic system for reading the UPC bar code.
Figure 3:
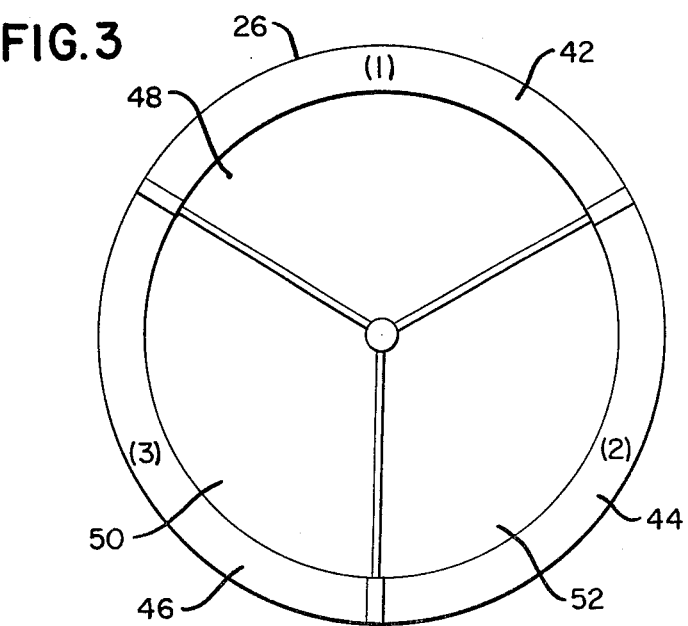
FIG. 3 is a front view of the rotating disc showing the location of the scanning and collection holograms.

Referring now to FIGS. 2 and 3, there is shown details of the construction of the rotating disc 26 (FIG. 1). As best seen in FIG. 3, the disc 26 comprises a glass plate on which is formed a plurality of scanning holograms 42, 44 and 46 positioned around the peripheral edge of the disc 26 and a plurality of collection holograms 48, 50 and 52 which coact with an associated scanning hologram to collect the diffusely reflected light beams from the UPC label 32. As is well-known in the art, a hologram is a recording of all the information in a wave front of light obtained from an object which is illuminated with spatially-coherent monochromatic light, rather than an image of the object obtained in ordinary photography. The term "monochromatic" light, as used herein, means light composed substantially of a single wave length, while "spatially-coherent" light, as used herein, means light emanating actually or apparently from a point source. The hologram consists of the recording of the interference fringes in the wave front covering a given area in a plane resulting from the interference between a first component of light obtained directly from a spatially-coherent monochromatic originating light source, which first component is directed to the given area in the plane at a predetermined angle with respect thereto, and a second component of light obtained from the object to be recorded which is illuminated by a light originating from the same light source simultaneously with the first component, the second component being directed at least in part to the given area in the plane of an angle $\alpha$ (FIG. 2) other than the aforesaid predetermined angle.

These interference fringes result from the fact that the difference in path length and hence the difference in phase, between the first or reference component of spatially-coherent monochromatic light and the second or information component of spatially-coherent monochromatic light varies from point to point. Therefore, constructive interference between the two components takes place at certain points, and destructive interference between the two components takes place at other points. Furthermore, the relative amplitude of the second or information component of such light varies from point to point. This causes a variation in the contrasts of the resulting interference fringes. In this manner, the recorded interference fringes form a pattern which defines both the amplitude and the phase of the second or information components as modulations in the contrast and spacing of the recorded interference fringes. This recorded pattern, which is called a hologram, contains all the information that can be carried by light waves transmitted through, reflected or scattered from an object.

A replica of the wavefront which comprises the second or information component may be constructed by illuminating a hologram with a source of spatially-coherent monochromatic light. In this case, the hologram diffracts light impinging thereon to form two sets of first order diffracted waves, each of which is a replica of the wave that issued from the original object. One of these two sets, the one projected back to the illuminating source, produces a virtual image of the original object, while the other of these two sets produces a real image of the object through the use of a lens. The virtual image is in all respects like the original object and, if the original object was three-dimensional, the reconstructed virtual image shows depth and gives rise to parallax effects between near and far objects in the same manner as did the original dimension object. The real image, however, is pseudo-scopic, that is, its curvature is reversed with respect to the original object, convex regions appearing to be concave, and vice-versa.

Figure 9:
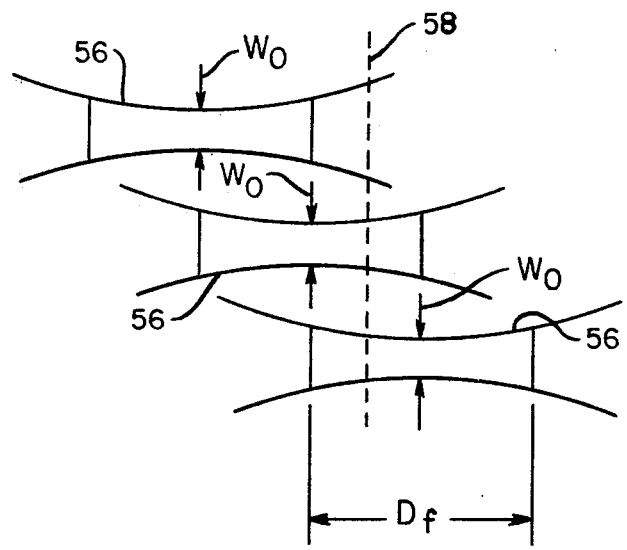
FIG. 9 is a schematic representation of the scanning beam of light showing the location of the depth of focus portions of the beams.

As illustrated in FIGS. 2 and 3, upon the laser 20 (FIG. 2) propagating a light beam 54 at one of a number of scanning holograms located along the outer perimeter of the disc 26, the light beam 54 will be deflected by the holograms in a 120 degree arc at an angle which varies slightly with each hologram. The scanning arc will have a radius $R_N$ (FIG. 2) which varies with each scanning hologram 42, 44 and 46. A wide range of $R_N$ values for the scanning holograms would result in a proportionately wide range of scan beams and therefore a wide range of tangential spot velocities which in turn would require a wide electronic bandwidth for the photodetector 34 (FIG. 1). Hence, the photodetector 34 would need a greater sensitivity to ambient electronic noise. By selecting a narrow range of $R_N$ values there is permitted a reduction in cost for the detector electronics while permitting enhanced electronic noise rejection. The tangential spot velocities for the scanning holograms 42–46 inclusive (FIG. 3) are located between 534 ft/sec and 555 ft/sec. The deflected light beam 56 will be focused at a point adjacent a target area represented by the line 58 in FIG. 2. Each of the scanning holograms 42–46 inclusive is constructed to have a different focal length which results in each of the deflected light beams 56 overlapping each other adjacent the plane 58 to produce an enhanced depth of focus formed by each of the scanning beams deflected by the holograms 42–46 inclusive. As shown in FIG. 9, the scan beam 56 projected by each of the scanner holograms 42–46 inclusive includes a portion $D_f$ characterized as the depth of focus in which the minimum spot size $W_0$ occurs at the center of the depth of focus portion. The scanning holograms 42–46 inclusive (FIG. 3) will project their light beams at the plane 58 (FIGS. 2 and 9) at which a UPC label 32 or the like is located. As shown in FIG. 9, this scanning action results in the depth of focus portions of each of the scanning beams 56 overlapping each other adjacent the plane 58 through which a bar coded label passes. Providing each of the scanning holograms 42–46 inclusive with a different depth of focus enables the scanning system to scan a bar coded label which may be orientated on the article passing through the target area at an angle with the plane 58, thereby increasing the rate of success of the scanning operations.

As shown in FIG. 3, the rotating disc 26 further includes a plurality of wedge-type collection holograms 48, 50 and 52, each of which is constructed so that the diverging point source characteristics of the reference wave of each of the collection holograms corresponds directly with the scan beam point source of its associated scanning hologram. This arrangement is illustrated in FIG. 2, wherein the reflected diffused wavefront 60 is directed at the collection holograms at the angle $\alpha$ allowing the holograms to focus a reconstructed scanning beam at a point 62 at which is located a stationary optical detector allowing the detector to generate the proper signals used in reading the bar coded label 32 (FIG. 1).

Figure 4:
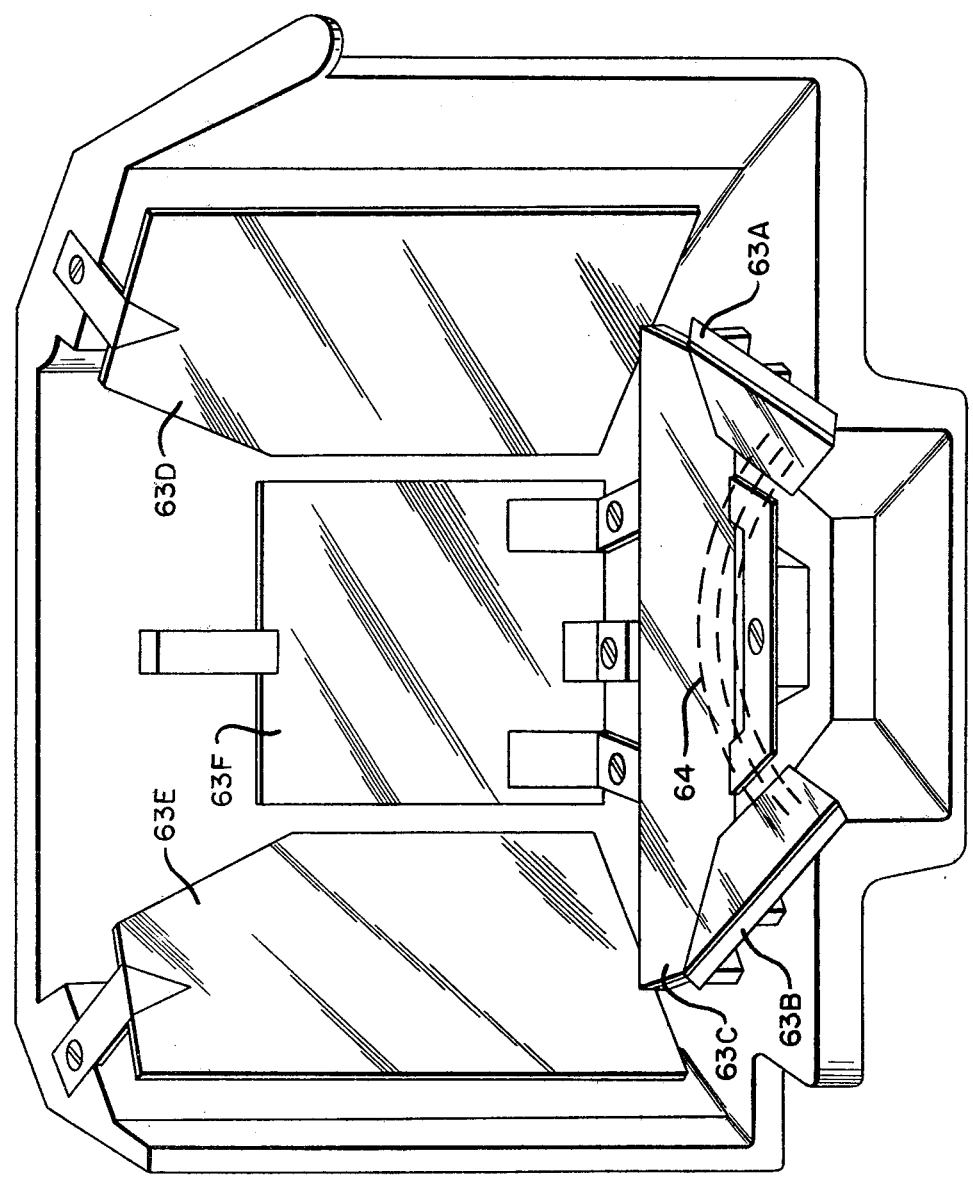
FIG. 4 is a front view of a mirror system used to generate a scanning pattern.
Figure 5:
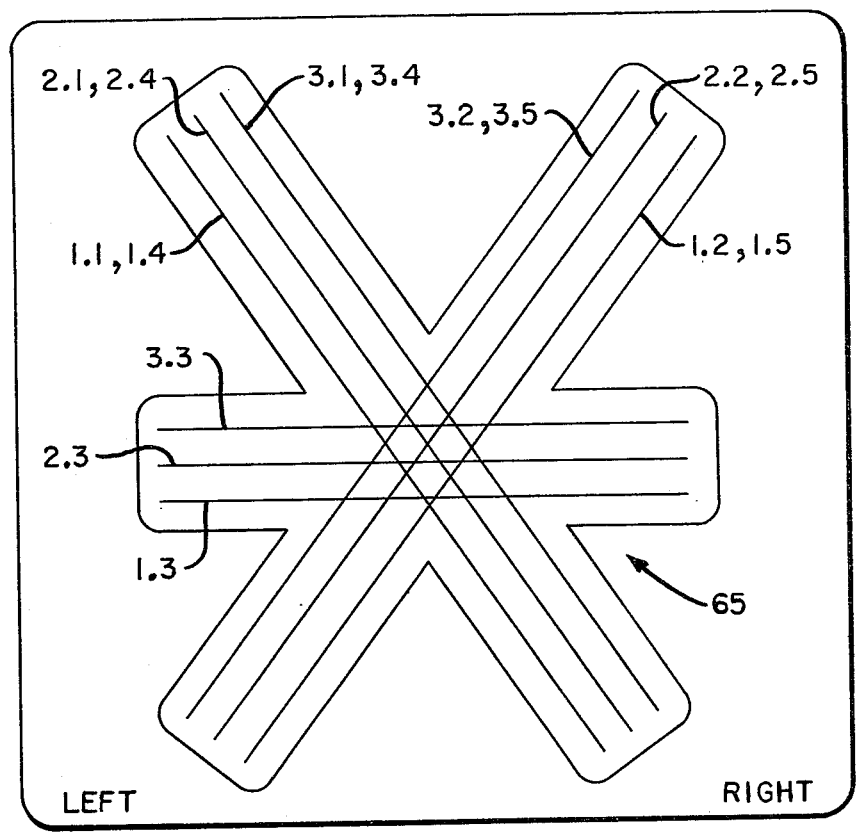
FIG. 5 is an illustration of a scan pattern generated by the scanning apparatus of FIGS. 3 and 4.

Referring now to FIG. 4, there is shown a front view of a mirror system corresponding to the mirror 30 (FIG. 1) which may be used to redirect the deflected scanning beams generated by the scanning holograms located in the rotating disc 26 at the target area. As shown in FIG. 4, the deflected scanning beam 56 (FIG. 2) will produce a scanning arc 64 against the mirror 63C which is reflected against the mirrors 63A–63F inclusive, thereby producing the crossed hatch scanning pattern generally indicated by the numeral 65 (FIG. 5). Each of the scan lines shown in FIG. 5 which constitute the scan pattern is composed of scanning beams generated by more than one of the scanning holograms. The following Table illustrates the mirror sequence for generating the scan line as numbered in FIG. 5 for each of the scanning holograms 42, 44 and 46 as identified in FIG. 3.

| HOLOGRAM | MIRROR SEQUENCE | SCAN LINE NUMBER | COMMENT |
| --- | --- | --- | --- |
| 1 (42) | B,E | 1.1 | Vertical, Left |
|  | C,E | 1.2 | Horizontal, Left |
|  | C,F | 1.3 | Center |
|  | C,D | 1.4 | Horizontal, Right |
|  | A,D | 1.5 | Vertical, Right |
| 2 (44) | B,E | 2.1 | Vertical, Left |
|  | C,E | 2.2 | Horizontal, Left |
|  | C,F | 2.3 | Center |
|  | C,D | 2.4 | Horizontal, Right |
|  | A,D | 2.5 | Vertical, Right |
| 3 (46) | A,E | 3.1 | Vertical, Left |
|  | C,E | 3.2 | Horizontal, Left |
|  | C,6 | 3.3 | Center |
|  | C,D | 3.4 | Horizontal, Right |
|  | A,D | 3.5 | Vertical, Right |

Figure 6:
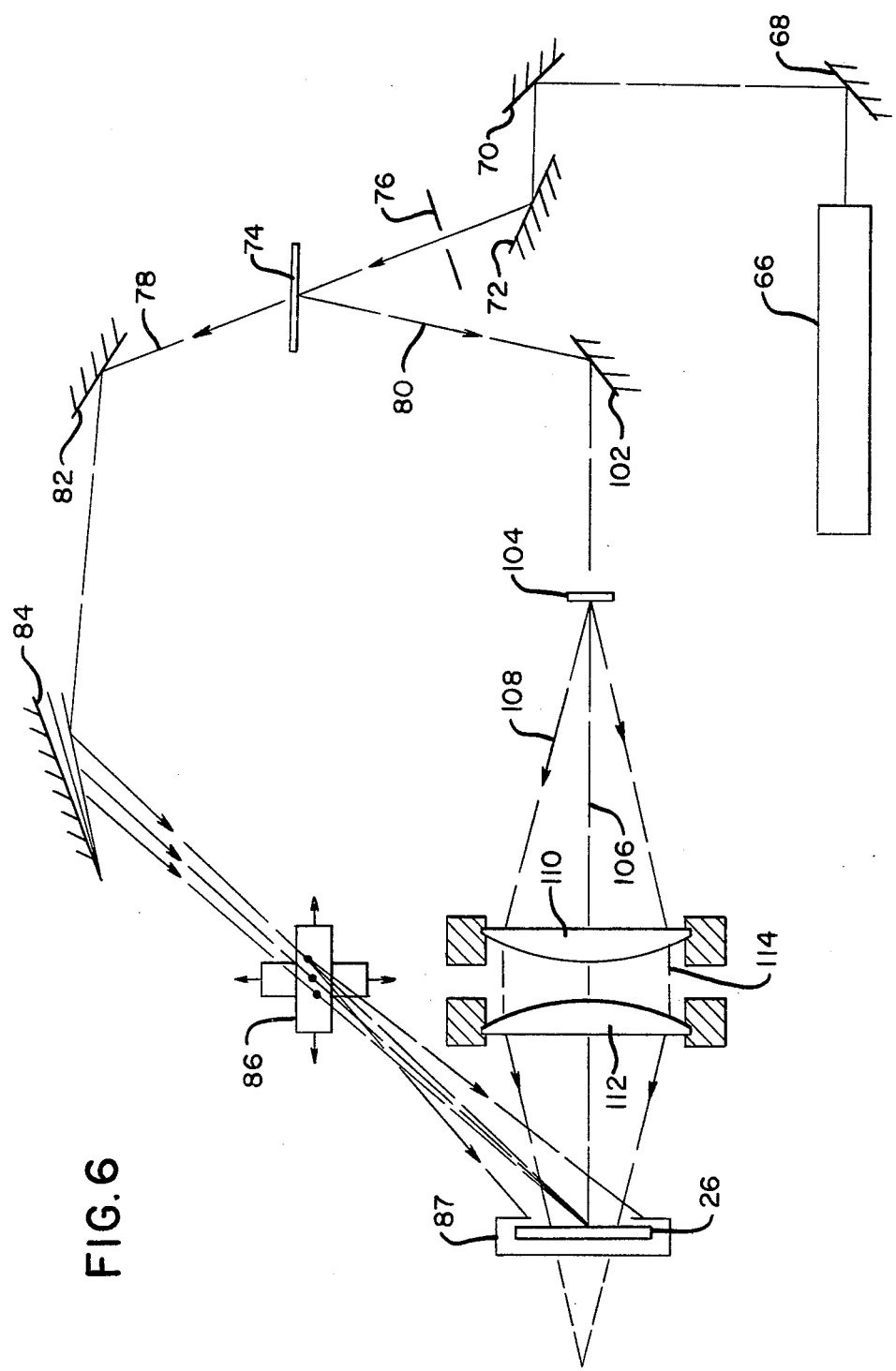
FIG. 6 is a top view of a schematic representation of the method for constructing the holograms located on the rotating disc.

Referring now to FIG. 6, there is shown a schematic representation of a top view of the method for constructing the rotating disc 26 of FIG. 1. The output beam of a 50–80 milliwatt helium-neon laser 66 is directed toward a mirror system comprising mirrors 68, 70 and 72 which deflect the light beam into a variable beam splitter 74 through a shutter 76 with the beam splitter 74 splitting the beam into two segments 78 and 80. The beam segment 78 is reflected from a mirror 82 to a variable-position mirror 84 which is orientated in one of three positions as shown, wherein each position is associated with the fabrication of one set of the scanning and collection holograms 42–52 inclusive (FIG. 3). From the mirror 84 the light beam segment 78 is reflected through a spatial filter/microscope objective assembly 86 which provides a translating off-axis point source with the corresponding position of the variable position mirror 84. The resulting diverging wave front functioning as the object beam will be centered on a rotating disc holder assembly 87 mounted for rotation and supporting the rotating disc 26 (FIGS. 2 and 3) in a position for the fabrication of the scanning and collection holograms.

Figure 7:
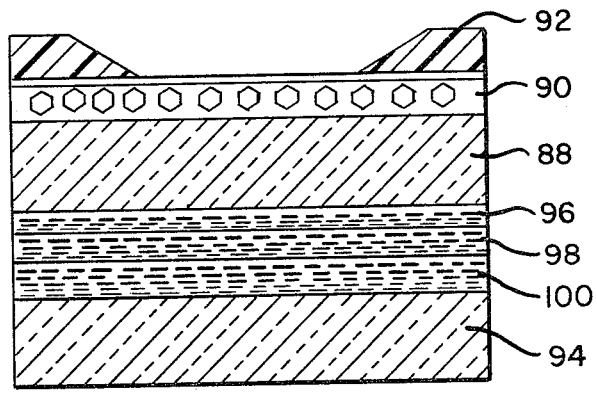
FIG. 7 is a cross-sectional view of the rotating disc showing details of the construction of the holograms.

As best seen from FIG. 7, th rotating disc 26 at the time of fabricating the holograms 42–52 inclusive comprises a glass substrate 88, the face of which is coated with a silver-halide emulsion 90 on which is positioned a movable wedge-shape exposure mask 92 for exposing portions of the silver-halide emulsion to form the interference pattern which constitutes the scanning and collection holograms. Sandwiched between the glass substrate 88 and a second glass substrate 94 are layers of an anti-halation backing 96, a low viscosity index matching fluid 98, and processed silver grains 100.

Referring again to FIG. 6, it is seen that the light beam segment 80 projected by the splitter 74 will be reflected by a mirror 102 toward a microscopic objective/spatial filter assembly 104 which generates an expanding light beam 108. The light beam 108 is directed to a lens element 110 which projects a collimated beam 114 to a second lens element 112 which in turn converges the collimated beam 114 toward the disc holder assembly 87.

In the operation of the method disclosed in FIG. 6, the rotating disc 26 with a properly-dimensioned collection hologram exposure mask 92 (FIG. 7) located on the face of the disc 26 is mounted in the holder assembly 87. With the variable position mirror 84 and the spatial filter/microscope objective assembly 86 adjusted to a first location, the shutter 76 is activated to expose the face of the disc 26 in which the mask 92 permits only one pie-shaped wedge area of the loaded silver-halide disc to be exposed for each angular rotational position of the disc 26. The mask 92 is then covered completely and the holder assembly 87 rotated to the next position for exposure of the second collection hologram. The variable position mirror 84 and the objective assembly 86 are readjusted to locate the focal point at a distance which differs with that of the other collection holograms. After the third collection hologram has been exposed, the lens member 112 is removed resulting in the collimated beam 114 being directed at the disc 26.

At this time the mask 92 associated with the collection holograms 48–52 inclusive is replaced with a mask for exposing the scanning hologram 42–46 portion of the rotating disc 26. The sequence of adjusting the position of the variable position mirror 84 together with the objective assembly 86 and the holder assembly 87 is, in the manner described above, repeated, which allows the scanning holograms 42–46 inclusive (FIG. 3) to be fabricated. The exposed rotating disc 26 may be processed in any conventional manner as is well-known in the art.

Figure 8:
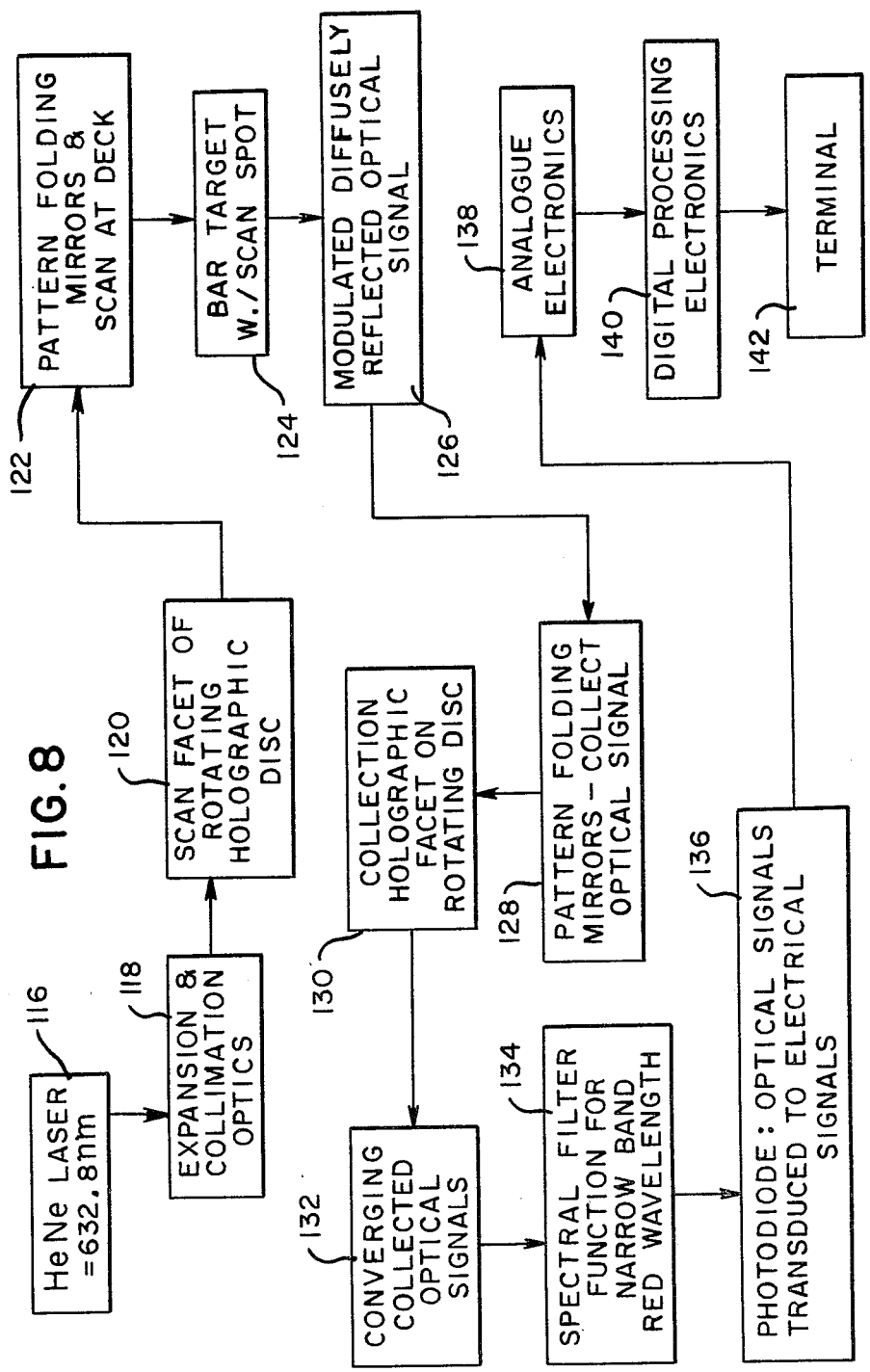
FIG. 8 is a block diagram of the present system for reading the UPC bar code.

Referring now to FIG. 8, there is shown in block form a flowchart of the operation of the scanning system disclosed in FIG. 1. Operation of the helium-neon laser 20 (block 116) results in the projection of a scanning beam to the beam forming optics, an example of which may comprise the expansion and collimation lenses 22, 24 (block 118) from which the collimated scanning beam will impinge on the scanning holograms 42–46 inclusive (FIG. 3) of the rotating disc 26 (block 120), each of which deflects the scanning beam to the pattern focusing mirror 30 (block 122) which in turn directs the scanning beam at the target area where the beam will scan the bar coded label 32 (block 124) in a scan pattern (FIG. 5) as determined by the arrangement of the mirrors 63A–F inclusive (FIG. 4). The scanning beam is reflected from the label 32 as a modulated diffusely-reflected optical signal (block 126) which is deflected by the pattern folding mirror 30 (block 128) towards the collection holograms in the rotating disc 26 (block 130). The collection holograms 48–52 inclusive focus the collected light beams (block 132) through a filter (block 134) at a point occupied by the photodiode 34 (block 136) which converts the received light beams into electrical signals, which signals are then processed (block 138) and then decoded (block 140). If a valid read operation has occurred, a display on the scanner 40 is energized (block 142) indicating such a condition to the operator.

Although the preferred embodiment only of the present invention has been described herein, it is not intended that the invention be restricted thereto, but that it be limited only by the true spirit and scope of the appended claims.

We claim:

1. An apparatus for scanning an article comprising:
   a source of light beam;
   a rotating member positioned to receive said light beam;
   a plurality of first hologram members located on said rotating member to intercept said light beam, each of said hologram members having a different focal plane for focusing said light beam at a scanning area which overlaps the focal plane of each of the other hologram members adjacent said scanning area through which an article passes;
   means located on said rotating member for collecting the light beams reflected from the article and focusing the reflected light beams at a collection point; and
   means positioned as the collection point for detecting changes in the light beams reflected from the article.

2. The scanning apparatus of claim 1 in which said collecting means comprises second hologram members located on said rotating member for focusing the reflected light beams at said collection point.

3. The scanning apparatus of claim 2 in which each of said first hologram members is constructed from a reference beam and an object beam and each of said second hologram members is constructed in association with the construction of one of said first hologram members, said second hologram member being constructed for focusing on said collection point a converging light beam corresponding to the reference beam of its associated first hologram member and reconstructed from the light beams reflected from the article.

4. The scanning apparatus of claim 3 in which said rotating member includes a peripheral edge adjacent to which is located said first hologram members and said second hologram members are located in the same plane on said rotating member as said first hologram members.

5. The scanning apparatus of claim 4 in which each of said first hologram members is constructed to deflect the intercepted light beam at an angle with the scanning area which is different from the deflected angles of each of the other said first hologram members for producing spot velocities at the scanning area which varies by less than one percent.

6. Apparatus for generating a multiple-line scan pattern at a target area in a scanning system comprising:
   a source of coherent light beam;
   a rotating member positioned to receive said light beam;
   a plurality of first hologram members located on said rotating member to intercept said light beam, each of said first hologram members constructed to focus said light beam to a point in a plane adjacent to the plane of said target area which is different from the plane of the focal length of each of the other first hologram members, each of said first hologram members projecting the light beam in a line whose path is parallel to the line of projection of each of the other of said first hologram members during rotation of said rotating member;
   a plurality of second hologram members located on said rotating member in the same plane as said first hologram member for collecting the light beams reflected from a coded label passing through said target area, each of said second hologram members constructed to focus the reflected light beams at the same collection point;
   and photodetector means positioned at said collection point for detecting changes in the intensity of the light beams reflected from an article passing through said target area.

7. The scanning apparatus of claim 6 in which each of said first hologram members is constructed from a reference beam and an object beam and each of said second hologram members is constructed in association with the construction of one of said first hologram members wherein each of said second hologram members is constructed for focusing at said collection point a converging light beam corresponding to the reference beam of its associated first hologram member and reconstructed from the light beams reflected from the article.

8. The scanning apparatus of claim 7 in which said rotating member comprises a circular disc mounted for rotation about its center, said first hologram members are located along the peripheral edge of said disc for intercepting the coherent light beam from said light source.

9. The scanning apparatus of claim 7 in which said second hologram members are located on said disc adjacent its associated first hologram member for collecting the diffused light beams focused on the article by its associated first hologram member and reflected from the article as it passes through the target area.

10. The scanning apparatus of claim 9 in which each of said first hologram members is constructed to deflect the intercepted light beam at an angle with the target area which varies with the deflected angles of each of the other of said first hologram members for producing spot velocities on the target area which varies by less than one percent.

11. A method of scanning the surface of a coded label comprising the steps of:
   moving a plurality of first holograms each constructed from a reference beam and an object beam transversely through a first coherent light beam for reconstructing light beams at a depth of focus which is different from and overlaps the depth of focus of each of the other of said first holograms;
   positioning a coded label at the location of the reconstructed light beam to enable the reconstructed light beams to scan the coded label and to be reflected therefrom;
   moving a plurality of second holograms through the reflected light beams reconstructed from the reference beam of an associated said first hologram member to reconstruct a second light beam corresponding to the reflected light beams of its associated first hologram member;
   and converting the light energy at the focus point of said second light beam to an electrical signal.

* * * * *